United States Patent [19]

Wise et al.

[11] Patent Number: 5,055,838
[45] Date of Patent: Oct. 8, 1991

[54] SILICON TACTILE IMAGING ARRAY AND METHOD OF MAKING SAME

[75] Inventors: Kensall D. Wise, Ann Arbor, Mich.; Kenichiro Suzuki, Kanagawa, Japan

[73] Assignee: The Regents of the University of Michigan, Ann Arbor, Mich.

[21] Appl. No.: 282,052

[22] Filed: Dec. 9, 1988

[51] Int. Cl.$^5$ .................. G08C 19/10; H03K 17/94
[52] U.S. Cl. .................. 340/870.370; 341/27; 341/33; 341/34; 901/33; 310/338; 361/283; 361/290; 73/862.04
[58] Field of Search .................. 340/870.37; 341/33, 341/34, 27; 901/33, 46; 324/658, 661, 686, 679, 680; 310/311, 318, 358, 363, 365, 367; 361/283, 290, 291; 73/862.04

[56] References Cited

U.S. PATENT DOCUMENTS

| | | | |
|---|---|---|---|
| 4,555,953 | 12/1985 | Dario et al. | 901/33 X |
| 4,555,954 | 12/1985 | Kim | 901/33 X |
| 4,746,812 | 5/1988 | Amazeen et al. | 901/33 X |

OTHER PUBLICATIONS

Hackwood, et al., "A Torque Sensitive Tactile Array for Robotics", International Journal of Robotics Research, vol. 2, No. 2, Summer, 1983, pp. 46-50.
K. Petersen et al., "A Force Sensing Chip Designed for Robotic and Manufacturing Automation Applications", 1985 IEEE, pp. 30-32.
K. J. Chun & K. D. Wise, "High Performance Silicon Tactile Imager Basedon on a Capacitive Cell", IEEE Transactions on Electron Devices, vol. ED-32, No. 7, Jul., 1985, pp. 1196-1201.
K. J. Chun & K. D. Wise, "A capacitive Silicon Tactile Imaging Array", Proceedings of the International Conference on Solid State Sensors and Actuators Transducers, 85, Boston, Mass., Jun. 11-14, 1985, pp. 22-25.
S. Sugiyama, et al., "High Resolution Silicon Pressure Imager with CMOS Processing Circuits", IEEE Transducers' 87, pp. 444-447.
Henry Allen, et al., "A Subminiature Load Cell Configurable for Multiplexed Tactile Arrays", Transducers' 87, pp. 448-450.
Paul Regtien, "Integrated Tactile Imaging Sensor", Transducers' 87, pp. 451-455.
R. A. Boie, "Capacitive Impedance Readout Tactile Image Sensor", IEEE (1984), pp. 370-378.
R. White & A. King, "Tactile Array for Robotics Employing a Rubbery Skin in a Solid State Optical Sensor", IEEE Transducers' 85, pp. 18-21.
K. Wong & J. Van der Spiegel, "A Shielded Piezoresistive Tactile Sensor Array", Transducers' 85, pp. 26-29.
M. Railbert, "All Digital VLSI Tactile Array Sensor", IEEE, 1984, pp. 314-319.
M. Railbert, J. Tanner, "Design and Implementation of VLSI Tactile Sensing Computer", International Journal of Robotics Research, vol. 1, No. 3, Fall, 1982.
W. D. Hillus, "A High Resolution Imaging Touch Sensor", International Journal of Robotics Research, vol. 1, No. 2, Summer, 1982, pp. 33-44.

Primary Examiner—Donald J. Yusko
Assistant Examiner—Michael Horabik
Attorney, Agent, or Firm—Harness, Dickey & Pierce

[57] ABSTRACT

A high-performance single-crystal silicon tactile imaging array organized in a X-Y matrix of capacitor elements. Metallic column lines are formed on a glass support substrate, while the row lines are formed from a contiguous chain of doubly-supported bridge structures, with one such structure for each sensing element. All of the bridge structures are simultaneously fabricated from a single-crystal silicon semiconductor wafer using a two-step boron diffusion process, followed by a silicon-to-glass electrostatic bonding step and subsequent unmasked wafer dissolution. Each bridge structure has a thick center plate for the sense capacitor supported by thinner beams connected to adjacent row single-crystal silicon support rails bonded to the glass substrate. The force sensitivity and maximum operating range of the tactile imager can be selected over a very wide range by appropriately setting the dimensions of these thinner support beams. The resulting imager is rugged, of high resolution and high density, and is inherently stable over time and temperature.

14 Claims, 3 Drawing Sheets

SILICON TACTILE IMAGING ARRAY AND METHOD OF MAKING SAME

FIELD OF THE INVENTION

This invention relates generally to miniature tactile imaging arrays and in particular to capacitive silicon imagers having a matrix of sensors made from single-crystal silicon material bonded to an insulating substrate such as glass.

BACKGROUND OF THE INVENTION

In robotics health care, aeronautics and space applications, tactile sensors are playing an increasingly important role in providing a robot or other pre-programmed automatic controller with the necessary information that will enable the robot or controller to operate in a nonstructured environment. Many industrial applications require robots with precision control and manipulation of a robotic arm. These applications include such areas as automobile assembly, automated semiconductor processing and the like. Tactile sensors can be used to provide a robot arm with a sense of touch, that is, the amount of exerted pressure and/or force and its distribution. Tactile sensors are being increasingly used to supplement the loss of visual information experienced by blind persons. In space and aeronautic applications high-precision tactile sensors are required, as for example, in an "astronaut glove."

For all such applications it is important to have tactile sensors that are stable over time, precise, rugged, and have as high a resolution as may be required. Many existing tactile sensors have shortcomings that limit their ability to be successfully applied in various applications, including instabilities and sensitivities to parameters such as temperature, lack of high resolution, high costs and complex construction and fabrication methods. In light of the foregoing, it is clear that the successful development of a high-performance reliable tactile imager remains an important goal of robotics in spite of a wide variety of reported designs.

Some of the more interesting design approaches have been based upon semiconductor technology. The usual goals to be achieved by using such technology are high density, high resolution and high reliability tactile sensor arrays in a low-cost process. Examples of such approaches are found in M.H. Raibert, "An All-digital VLSI Tactile Array Sensor," *Proceedings of the International Conference on Robotics* pp 314–319 (Atlanta, Ga.; Mar., 1984); R.A. Boie, "Capacitive Impedance Readout Tactile Image Sensor." *Proceedings of the International Conference on Robotics* pp. 370–378 (Atlanta, Ga.; Mar., 1984); K. Chun and K.D. Wise, "A High-Performance Silicon Tactile Imager Based on a Capacitive Cell," *IEEE Trans Electron Devices* Vol 32, pp 1196–1201 (July, 1985). However, most such structures do not lend themselves easily to very large high-resolution arrays and are limited by the size of the imaging cell.

Recently a piezoresistive 32×32 element tactile imager using deposited thin film diaphragms was reported. See S. Sugiyama et al , "High-Resolution Silicon Pressure Imager with CMOS Processing Circuits," *Transducer '87*, pp. 444–447 (June, 1987). Although this device is compatible with the integration of on-chip CMOS circuitry, it requires a complex fabrication process capable of precise control. In particular, the deposited thin film materials employed are known to present problems when deposited to a thickness greater than three microns. Moreover the reproducibility of such thin film processes has historically been difficult to control, and the mechanical strength and integrity of such deposited thin films does not equal that of single-crystal silicon films.

In light of the foregoing problems and shortcomings, it is an object of the present invention to provide a high-performance multi-element capacitive silicon tactile imaging array for use in applications where high density and high resolution are important.

A further object of the present invention is to provide a capacitive tactile imager made using a high-yield fabrication process starting with a single-crystal silicon wafer for excellent strength, uniformity and reproducibility.

Yet another object of the invention is to provide a tactile imager which offers six or more bits of force resolution with a maximum operating force of at least about one gram per element.

Still another object of the present invention is to introduce a new capacitive element structure for tactile sensing which employs a thick center plate for the sense capacitor supported by thinner support beams on either side of the center plate, which can be readily scaled up or down in size and in sensitivity.

One more object is to provide a sensor structure compatible with the fabrication of a tactile imager on thin glass substrates capable of bending and mounting on curved surfaces, thereby mimicking human fingers.

SUMMARY OF THE INVENTION

To realize the above-identified objects, there is provided, in accordance with one aspect of the present invention, a miniature tactile imaging array having a plurality of adjustable parallel plate capacitors each of which is responsive to force applied to one plate thereof. This tactile imaging array comprises: a support substrate having an insulating surface; at least first and second electrically conductive stripes spaced from one another and disposed on the insulating surface and constituting a set of address lines; a first plurality of electrically conductive plates spaced apart from one another and electrically connected to the first stripe, each such plate forming one plate of a distinct one of the adjustable capacitors; a second plurality of electrically conductive plates spaced from one another and electrically connected to the second stripe, each such plate forming one plate of a distinct one of the adjustable capacitors; and first and second pluralities of force-sensitive bridge structures made from a common wafer of single-crystal semiconductor material. The first and second pluralities of bridge structures are electrically isolated from one another. The bridge structures within each such plurality are electrically interconnected to one another and constitute at least one part of one line of a set of output lines. These output lines are formed so as to cross the set of first address lines at an angle, such as 90 degrees.

Each such bridge structure preferably includes a central plate portion, a pair of flexible beam portions thinner than the central plate portion and which are connected to, support, and extend outwardly from opposite sides of the central plate portion, and a pair of side support portions each permanently attached to the support substrate and connected to and supporting a distinct one of the beam support portions on a side thereof opposite the central plate portion. The central plate portion and the beam portions being positioned and patterned such that the central plate portion is nominally suspended a predetermined distance above the insulating surface of the support substrate. Each such bridge structure is positioned with its central plate portion located above a distinct one of the electrically conductive plates, whereby each such central portion constitutes a second plate of a distinct one of the adjustable capacitors. The single-crystal semiconductor material is preferably primarily if not substantially exclusively silicon which has been doped so as to be at least moderately electrically conductive. In order to increase the density of the imaging array the bridge structures associated with each of the second address lines are preferably contiguously arranged such that the single-crystal semiconductor material extends continuously from near one side of the array to near the opposite side of the array without interruption. Also, adjacent bridge structures at each second address line may share a common side support portion, with one of the beam support portions of each such adjacent bridge structure extending in opposite directions away from the side support portion.

According to a second aspect of the present invention, there is provided a miniature tactile sensor structure made at least in part from single-crystal semiconductor material including therein a parallel plate capacitor whose capacitance varies generally in accordance with the magnitude of a mechanical force applied thereto. The sensor structure comprises: a support substrate having at least one generally flat surface upon which an electrically conductive pad is formed; and a force-sensing bridge structure made from a unitary piece of patterned single-crystal semiconductor material mounted to the support substrate about the pad. The pad constitutes one plate of the capacitor of the sensor structure, and the bridge structure has a pair of generally elongated support rails spaced apart from one another which are permanently mounted to the support substrate. These support rails have a predetermined first height, and a relatively thick plate centrally located between the pair of support rails. The bridge also includes a pair of flexible relatively thin beams located on opposite sides of and mechanically interconnecting the thick plate to the support rails, thereby allowing the thick plate to move in response to a sufficient mechanical force applied thereto in a direction normal to the surface of the support substrate. The thick plate is spaced apart from the surface of the support substrate, is supported by the thin beams, and has a second height above the surface of the support substrate greater than the first height. This helps ensure that mechanical contact between the bridge structure and a much larger mechanical object moving generally perpendicular towards the bridge structure occurs first at the thick plate.

According to a third aspect of the present invention, there is provided an improved tactile imaging system of the type including a tactile imaging array having at least two readout lines and a plurality of amplifiers to which the readout lines are electrically connected. The improvement comprises a plurality of multiplexer means disposed between the readout lines and the amplifiers, each such multiplexer means including at least four analog input lines and at least one output line. The multiplexer means are for selectively connecting in succession each of its input lines to its output line so that the output of the at least four readout lines from the tactile imaging array is deliverable over the one output line of the multiplexer means to one of the amplifiers. This multiplexer arrangement greatly reduces the number of external electrical connections which need to be made to the tactile imaging array.

According to a fourth aspect of the present invention, there is provided a method of fabricating a tactile imaging array having a plurality of sensors from a wafer of single-crystal semiconductor material, with each sensor being simultaneously formed and provided with a bridge structure made with a single piece of single-crystal semiconductor material. Each sensor is simultaneously formed and provided with a bridge structure including a central plate, a pair of support beams and a pair of support islands. The method comprises the steps of: (a) selectively removing first regions on one side of the wafer to form mesas which will eventually become support islands, with each such mesa having a flat surface arranged along a common plane; (b) impregnating selected first portions of the wafer including the mesas formed in step (a) with a material which alters the rate at which the impregnated portions of the wafer may be removed relative to the remainder of the wafer not so impregnated, such that those first selected portions of the wafer which will become the support islands and the central plate of each sensor; (c) impregnating selected second portions of the wafer including at least two areas of the wafer per sensor distinct from the selected first portions, such that those second portions of the wafer which will become the beam support portions of each sensor; (d) forming a set of address lines upon one side of an insulating substrate; (e) bonding the flat surfaces of the mesas to the insulating substrate; and (f) removing substantially all of the first substrate except for the selected first portions and selected second portions.

These and other objects, advantages and aspects of the present invention may be further understood by referring to the detailed description, accompanying figures and appended claims.

BRIEF DESCRIPTION OF THE DRAWINGS

The drawings form an integral part of the description of the preferred embodiments and are to be read in conjunction therewith. For ease of illustration and to render the embodiments more understandable, the various layers and features in the figures are not shown to scale. Identical reference numerals designate like layers or features in the different figures and embodiments, where.

DETAILED DESCRIPTION OF THE PREFERRED EMBODIMENTS

Figure 1:
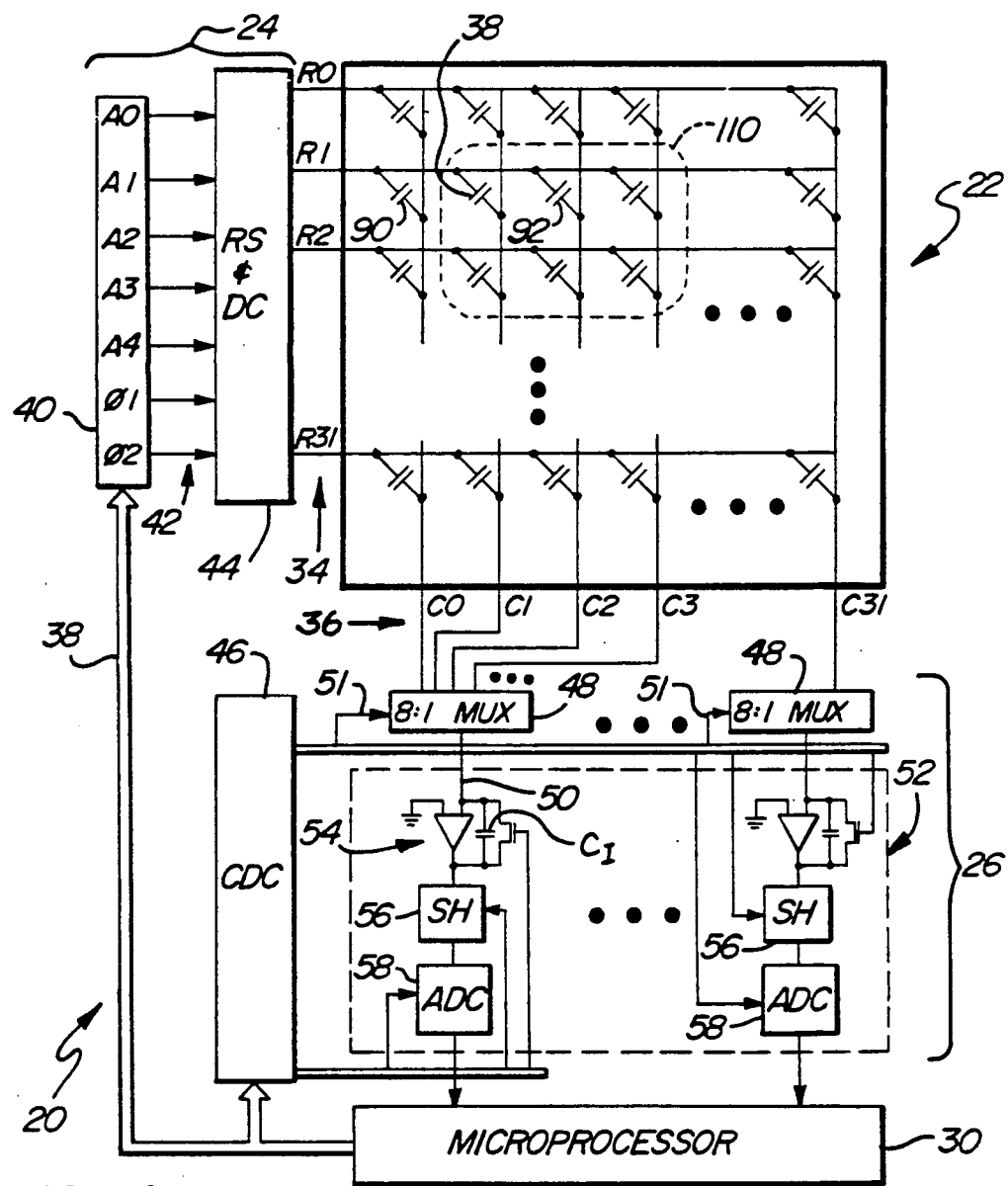
FIG. 1 is an overall block diagram of a tactile imager system of the present invention including the tactile imaging array of the present invention and its associated circuitry required utilize same.

Referring now to FIG. 1, there is shown a tactile imaging system 20 of the present invention, which is comprised of a 32×32-element tactile imaging array 22, input circuitry 24, readout circuitry 26 and an electronic controller which may be a conventional microprocessor 30.

The imaging array 22 is fabricated on a substrate 32 and is organized as an X-Y matrix with a set 34 of first address lines R0 through R31 and a set 36 of output lines C0 through C31. For convenience the X and Y lines 34 and 36 will respectively be referred to as row and column lines from time to time. Force sensors such as sensor 38 are formed at the row-column intersections. The 32 row lines R0–R31 are selected by address signals provided on address and control bus 38 to decoder 40, which operates in a conventional manner. Specifically, each of the row lines is selected by an address signal (A0–A4) provided on control lines 42 connected to the conventional row select and drive circuitry 44. The selected row line is driven by a logic pulse $V_p$ during clock phase $\phi 1$, and if desired, a force insensitive dummy row line, which will be explained later, driven by opposite clock phase $\phi 2$.

The output signals are provided on address lines 36, which are respectively connected to one of the four multiplexers 48. Under the timing control signals produced by column decoder circuitry 46 operated in accordance with timing and control signals from bus 38, the appropriate multiplexer 48 directs the signal from the selected one of eight column lines connected thereto to its output line 50 which delivers the unamplified output signal to signal conditioning circuitry section 52. Section 52 includes four column charge amplifiers 54, four sample and hold circuits 56, and four analog-to-digital converters 58. The output of the analog-to-digital converters 58 is sampled under control of timing signals from column decoder 46 in a conventional manner by microprocessor 30 using well-known techniques.

The input electronics 24, the microprocessor 30 and the signal conditioning circuitry 52 are all conventional. This type of electronics setup and signal processing is described in detail in the aforementioned July, 1985 article by K. Chun and K.D. Wise, and thus need not be further described here. The multiplexers 48 may each be an Analog Devices Inc. 8-to-1 multiplexer model No. AD7501, and each is controlled via timing signals received from the column decoder circuitry 46 over the control lines 51 such that each of the eight column lines connected to a multiplexer 48 is sampled in succession.

The charge column amplifiers 54 integrate the difference charge induced on the columns providing an output voltage pulse $V_O$ whose amplitude is proportional to the crosspoint capacitance change $\Delta C$, which in turn is proportional to the local applied force:

$$V_0 = V_p = \frac{(C_X - C_R)}{C_I} = V_p \frac{\Delta C}{C_I} \quad (1)$$

where $C_X$ and $C_R$ are the transducer and reference capacitors, respectively and $C_I$ is the integration capacitor. It is noted that Eq. (1) shows that shunt parasitic column capacitance does not affect the output voltage so long as the integration gains are high. This formula and the capacitances referred to therein are explained in detail in aforementioned July, 1985 article.

Figure 2:
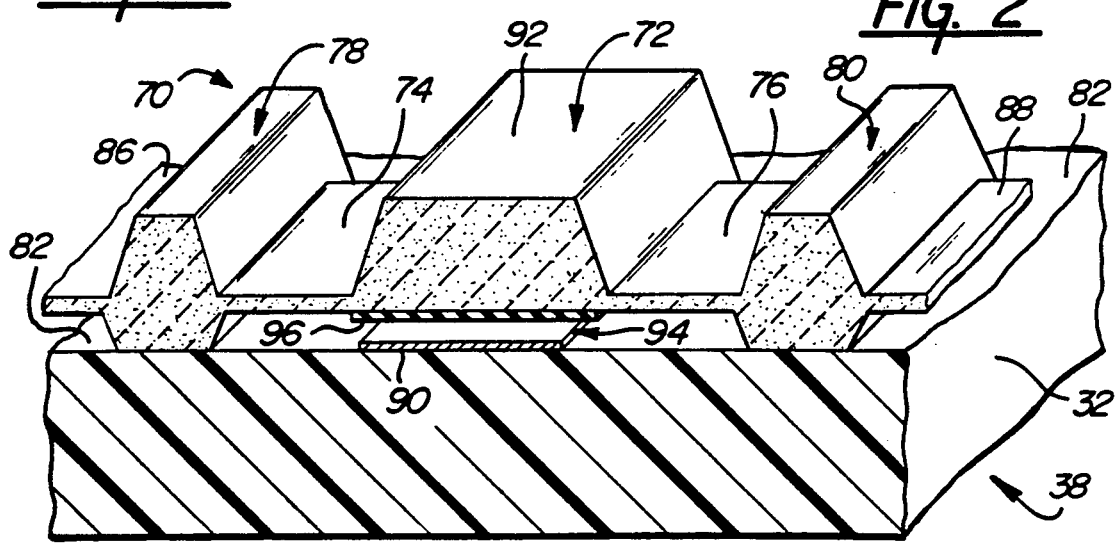
FIG. 2 is a cross section of a single imaging cell of the FIG. 1 tactile imaging array.

FIG. 2 shows a typical force sensing element of array 22, which for ease of discussion here will be assumed to be sensor 38. In order to keep the cell size small while maintaining high sensitivity, a novel doubly-supported bridge structure 70 is used as a force sensor. The bridge structure 70 occupies a smaller area for a given sensitivity than would a typical pressure-sensing diaphragm structure which includes a rim substantially all the way around the flexible diaphragm. The bridge structure 70 in FIG. 2 is shown located on an insulating substrate 32, which is preferably made of a glass selected to have a coefficient of thermal expansion closely matching of that of the single-crystal silicon material used in the bridge structure.

The structure 70 includes a central plate portion 72, a pair of flexible beam portions 74 and 76, and a pair of side support portions or rails 78 and 80 permanently attached to the surface 82 of the support substrate 32. Parts of adjacent flexible beam portions 86 and 88 belonging to adjacent, neighboring force sensors 90 and 92 (see FIG. 1) are shown extending outwardly from support rails 78 and 80 in directions extending outwardly from central portion 72.

The bridge structure 70 forms part of the row line R1 shown in FIG. 1. Each of the horizontal row lines consists of successively arranged, contiguous bridge structures identical to structure 70 shown in FIG. 2, as will be further explained. These horizontal row lines are formed of highly-doped (p+) silicon semiconductor material which has been patterned in the manner shown. Adjacent row lines are physically isolated from one another as will be further explained to reduce coupling between them. High resolution and fast response are thus achieved due to the low capacitance of the glass substrate 32 and the low electrical resistance of the highly boron-doped silicon rows which are used as the row conductors. As may thus now be appreciated from FIG. 2, a force-sensitive capacitor is formed by a metal plate 90 deposited on the glass substrate 32 directly beneath the electrically conductive thick central portion 72 of the structure 70, which acts as the other capacitor plate. Local force applied on the top surface 92 of the center plate 72 deflects the thin beams 74 and 76 to change the capacitive gap 94 and hence the capacitance of the cell.

The top surface 92 of the central plate 72 is higher than the top surfaces of the thin beam 74 and 76 which prevents physical damage to the beams and helps concentrate the applied force on the central plate 72, This also helps simplify the design of a protective covering or pad over the sensors of imaging array 22. A stress-compensated dielectric layer 96 is provided underneath the bottom surface of the central plate 72 as shown and has a total area somewhat greater than that of the metal plate 90 therebelow. The pattern of insulating layer 96 prevents an electric short between row line R1 and column line C1 when excessive force causes the central plate 72 and metal plate 90 to touch, thereby providing built-in short circuit and overrange protection.

Figure 3:
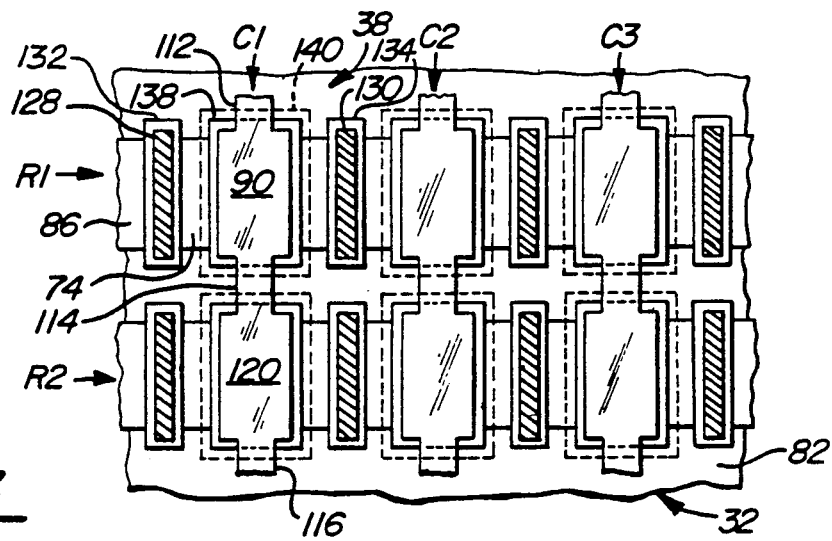
FIG. 3 is a plan view showing the arrangement of the metal column lines and boron-diffused single-crystal silicon row lines of six selected imaging cells of the FIG. 1 imaging array.

FIG. 3 is a diagrammatic plan view of the six sensors encircled by dotted line 110 in FIG. 1 which helps further explain the row and column construction of imager 22. All of the connecting traces, electrical contact/bonding pads, and column lines, including column lines C1, C2 and C3 shown in FIG. 3, are formed from a common layer of metals deposited over the entire surface 82 of substrate 32. The common layer is then selectively etched to form the traces pads and columns. The column lines are generally parallel to and physically separated from one another as shown. Each column includes thin connecting portions such as portions 112, 114 and 116 shown in column C1 and capacitor plate portions such as plates 90 and 120, respectively forming the lower half of the capacitors at the row-column intersections R1, C1 and R2, C1.

In FIG. 3, the silicon-glass bonding areas such as areas 128 and 130 are indicated by fine batching. The slightly larger rectangle appearing about the batched areas, such as rectangles 132 and 134, represent the outer boundaries (i.e., largest cross-sectional areas) of the side support portions or rails such as rails 78 and 80 shown in FIG. 2. The larger solid rectangles located above the plates of column lines C1-C4 such as large rectangle 138 located above plate 90 of sensor 38, represent the largest cross-sectional area of the central plates of the sensors, such as central plate 72 of sensor 38. The dotted rectangles centered around each of the lower capacitor plates, such as dotted rectangle 140, represent the outer boundaries and relative size of the dielectric layers, such as insulating layer 96 in FIG. 2.

FIGS. 4A through 4D illustrate the fabrication process used to simultaneously make each of the force-responsive capacitor plate sensors of array 22. A single-sided wafer process originally developed for an ultraminiature pressure sensor, has been used to fabricate prototypes of the tactile imaging array 22 of the present invention. The ultraminiature pressure sensor and process for fabricating same is described in U.S. Pat. application Ser. No. 07/057,884 filed June 1, 1987 in the names of K.D. Wise, et al now U.S. Pat. No. 4,815,471. The ultraminiature pressure sensor described therein includes a single-crystal silicon semiconductor diaphragm and rim structure electrostatically bonded to a glass substrate upon which is formed a metallic capacitor plate, connecting traces and bond pads. The rim and diaphragm structure is heavily doped with boron, and the diaphragm constitutes the upper, adjustable plate of the capacitor of the pressure sensor. The double-diffusion semiconductor processing techniques and electrostatic bonding techniques very similar to those used to fabricate the array 22, are described in detail there, and accordingly the entire disclosure of that patent application is hereby incorporated herein by reference. The fabrication process described therein eliminates the thick support rims used in conventional double-sided silicon wafer processing schemes, such as are shown in K. Peterson et al., "Silicon Fusion Bonding for Pressure Sensors." IEEE Solid-State and Actuator Workshop, pp. 143-147 (Hilton Head, S.C.; June, 1988).

The fabrication process for the tactile imaging array 22 starts with a p-type (100) silicon wafer 150 of standard thickness. The wafer 150 is first oxidized at 1100° C. for 40 minutes to form oxide layers 152 and 154 of 0.5 microns thickness on either side of the wafer. The layer 154 is then patterned using conventional photolithographic techniques to form oxide mask regions 156 and 158 shown in FIG. 4A. The wafer is then etched using a conventional wet KOH etching process to form the mesas 160 and 162 with recess 164 therebetween. The depth 166 of the recess 164 determines the separation of the capacitor plates in the sensors, which depth can be varied from less than one micron to more than ten microns.

Figure 4A:
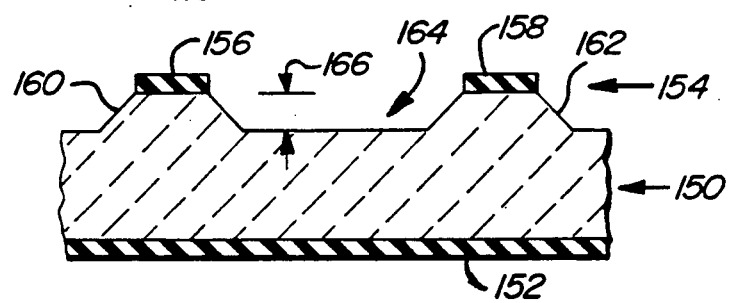
FIGS. 4A through 4D illustrate four successive partially-formed structures which explain the manner in which the tactile imaging array is formed.
Figure 4B:
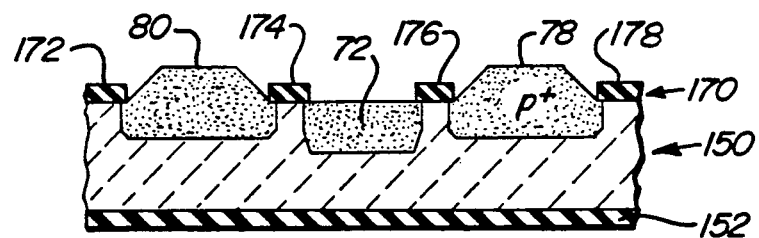
Figure 4C:
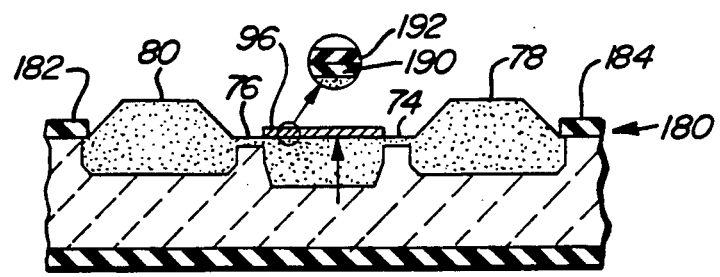

Next, as shown in FIG. 4B a second masking oxide layer 170 is grown at 1100° C. in a wet oxygen environment for about 210 minutes to a thickness of about 1.2 microns. As shown in FIG. 4B, the layer 170 is patterned leaving oxide regions 172-178. A deep boron diffusion step follows, for example, 15 hours at 1175° C., which defines the thick center plate region 72 and the side support rail regions 78 and 80, as shown in FIG. 4B. The center plate may typically be between 12 and 15 microns thick. After the remaining portions of oxide layer 170 is removed using a buffered HF etch, a third oxide layer 180 is grown and patterned as shown in FIG. 4C leaving masking portions 182 and 184. This is followed by a shallow boron diffusion at 1175° C. for forty-five minutes to define the support beams 74 and 76, as shown in FIG. 4C. The thickness of these thin beams can be varied over a large range by changing time and temperature of the shallow boron diffusion step. This feature together with this KOH etching step provides flexibility in scaling the sensitivity and operating range of the resultant tactile imager over several orders of magnitude. Finally, a 1200 angstrom thermal oxide layer 190 and a 1000 angstrom thick LPCVD silicon nitride layer 192 are deposited and patterned to form the dielectric film 96 to protect against overforce. The thickness of the layers 190 and 192 are chosen so as to provide a stress-compensated dielectric film 96 which has a coefficient of thermal expansion closely matched, in the expected range of operating temperatures of array 22, to that of single-crystal silicon.

Figure 4D:
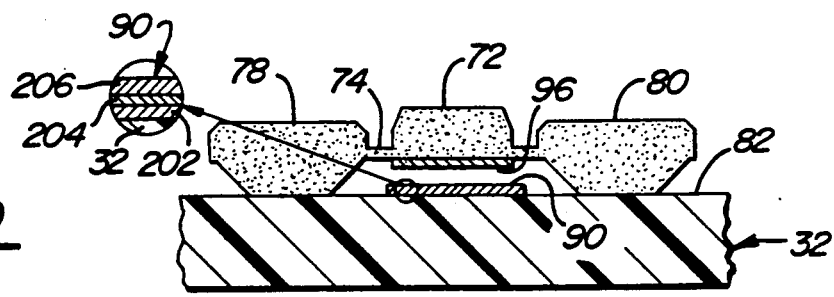
Figure 6:
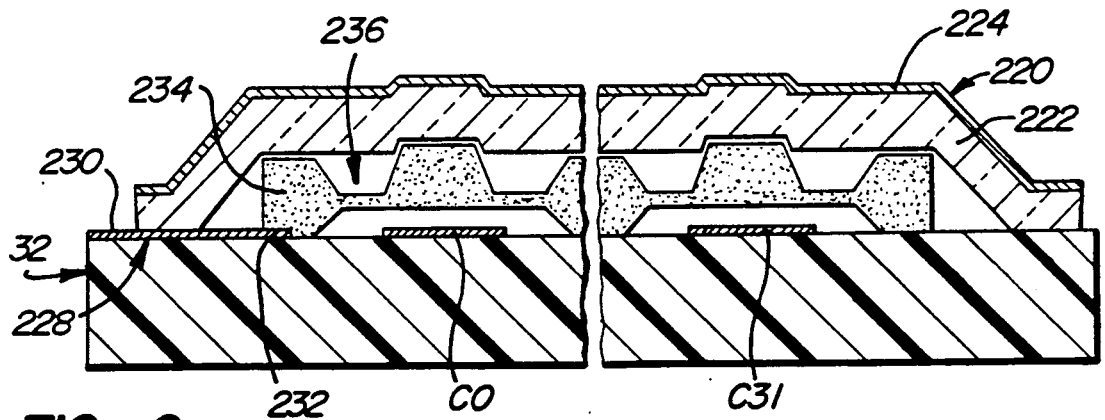
FIG. 6 is a fragmentary side cross-sectional view of the tactile imaging array of the present invention with a flexible protective covering thereover.

The glass processing begins with a Corning No. 7740 glass wafer 32. A composite metallization layer consisting of a bottom layer 202 of titanium 100 angstroms thick, an intermediate layer 204 of platinum 200 angstroms thick, and a top layer 206 of gold 2500 angstroms thick is deposited by conventional techniques such as sputtering or evaporation on the surface 82 of the glass 32, and is patterned as shown in FIGS. 3 and 4D to form the lower capacitor plate 90 (and other plates, traces, pads and columns as needed). This combination of metal layers was selected in order to also facilitate a batch lead transfer between the glass substrate 32 and the single-crystal silicon bridge structures on one end of rows R0-R31, as is shown in FIG. 6.

The gold layer 206 is then selectively removed in those areas where the single-crystal silicon and metal leads are to be bonded, which leaves the titanium/platinum metal lines to make contact with the single-crystal silicon. Thereafter, the silicon and glass wafers are diced into individual pieces and are cleaned using conventional solvents and ultrasound techniques in preparation for electrostatic bonding. The general electrostatic bonding technique is described in detail in U.S. Pat. application Ser. No. 07/156,854 filed Feb. 17, 1988 in the names of L.J. Spangler and K.D. Wise, the disclosure of which is hereby incorporated by reference.

The electrostatic bonding step used to construct prototype tactile imaging arrays of the present invention was performed at 425° C. with a voltage of 800 to 1000 volts applied between the silicon and glass. This bonding step has the effect of fusing the silicon row lines in the silicon-glass bonding areas (such as areas 128 and 130 shown in FIG. 3) to the glass, which forms an exceptionally strong permanent bond. The outside support rails of the single-crystal silicon bridge structures on the end of the silicon row lines are also pulled into intimate contact with the metal lines on the glass in the lead transfer areas by the attractive force of the electrostatic bond, resulting in a low contact-resistance lead transfer from the doped silicon row lines to the metal traces on the glass. A uniform contact resistance of 12 ohms has been measured in our prototype imaging arrays for silicon-platinum contacts having an area of 100 microns × 130 microns.

Finally, the device is placed in an ethylenediamine-pyrocatechol-water (EDP) etchant, which preferentially etches the undoped or lightly doped regions of the silicon wafer and stops (i.e., etches at least 40 times more slowly) on the boron p+ regions 78–80 and 90. This preferential etch step removes the entire silicon wafer 150, except for the heavily doped silicon bridge structures of the type shown in FIG. 4D. This approach of impregnating the wafer 150 with a material such as a p-type (or n-type) dopant to accomplish preferential etching is discussed in detail in U.S. patent application Ser. No 07/156,854 and need not be described further here. The overall fabrication just described for the array 22 requires only four non-critical masking steps for the silicon and results in very high yield.

Prototypes of a 32×32 element tactile imaging array 22 of the present invention have been constructed on a glass substrate having an overall size of 2.2 cm × 2.0 cm. The silicon chip utilized measured 1.8 cm × 1.7 cm, or roughly the size of a Lincoln penny. The cell capacitors of these prototypes were on 0.5 mm centers so that the total area coverage of the array was 1.6 cm × 1.6 cm. Our prototype arrays 22 had 34 silicon row lines, including 32 force-sensitive transducer rows and two force-insensitive dummy rows located at respectively at the top and bottom of the X-Y matrix. The 34 silicon row lines were bonded to metal row lines on the glass which led to bonding pads, while the 32 metal column lines passed horizontally under the silicon rows. The dummy sensors are made like the other sensors except that oxide masks 174 and 176 shown in FIG. 4B are omitted, resulting in thick inflexible support beams.

In the force sensors of our prototypes, the dimensions for the thin beams 74 and 76 were 300 microns × 600 microns × 2.5 microns, and for the thick sensor plate were 414 microns × 254 microns × 12.5 microns. The lower metallic plate area was $7.15 \times 10^4$ square microns and the capacitor gap was 2.5 microns. Scanning electron micrographs (200×) showed that the top surface 90 of the bridge structures were very flat and that the beams and thick center plates have rounded smooth corners.

In our prototypes, each of the transducer elements in the array had a zero-force capacitance of 0.22 pF with a maximum operating force of about one gram. Due to the overforce protection provided by the dielectric film (such as film 96) as the plates touch, the overforce limit is very high in the imaging array of the present invention. The operating dynamic range can be scaled over several orders of magnitude by changing the dimensions of thin beams 74 and 76.

Figure 5:
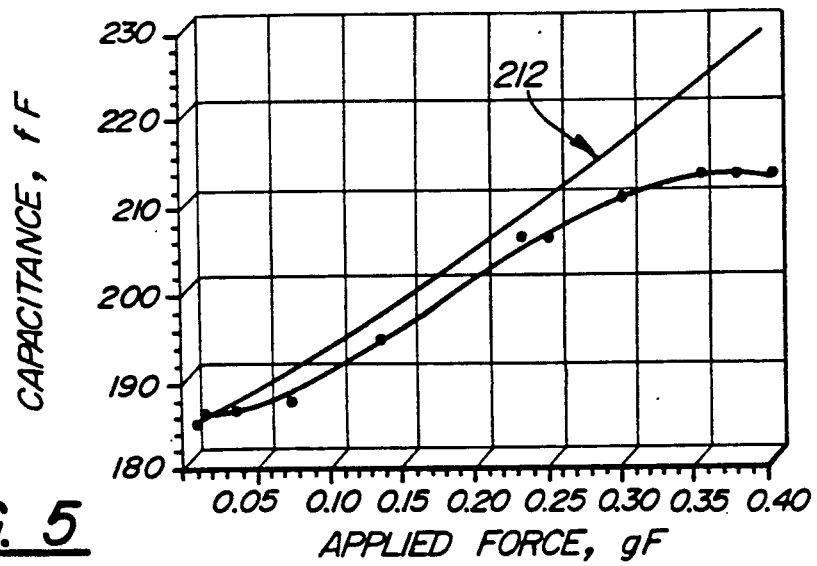
FIG. 5 is a graph showing the change in capacitance versus the applied force for a typical cell in a prototype tactile imager of the present invention.

FIG. 5 shows the capacitance change in our prototype imaging array 22 as a function of applied force for an individual imaging element. In FIG. 5, the upper curve 212 represents the predicted or theoretical values while the lower curve 214 represents the least-squares fit for the data points shown therein. The data was obtained by transforming the measured capacitance of a test structure with much longer thin beams, which was deflected by an electrostatic force, to the capacitance of the transducer element using well-known formulas from page 155 of R. Roark & W Young, *Formulas for Stress and Strain*, (Fifth Ed., McGraw-Hill). FIG. 5 shows that the measured sensitivity is about 0.45 pF/gm which agrees well with a calculated theoretical result of 0.35 pF/gm. The measured sensitivity is equivalent to a maximum output charge of 4.5 pC for an input or drive voltage of 10 volts. The maximum noise charge of the drive and readout electronics circuitry 24 and 26, which includes a switched-capacitor charge integrator, as shown in FIG. 1, was about 19 fC over a temperature range of 0–50° C. Accordingly, our prototype of the tactile imager system 20 of the present invention offers a force resolution of over seven bits. In addition, the prototype system required only about 20 microseconds per read operation. Since the prototype array 22 is read out with four columns in parallel, the effective element and frame rates are 5 microseconds and 5.1 milliseconds, respectively.

FIG. 6 illustrates one possible technique for packaging the tactile imaging array of the present invention to protect it in environments that are dirty or may result in contact with electrically conductive objects which could short out or otherwise attenuate or interfere with the electrical signals passing through the row or column lines. It is believed important to protect the row line R0–R32 from touching other objects since they carry input drive signals for selecting and reading individual rows. Also, as shown best in FIG. 2 the capacitive gaps 94 under the bridge structures 70 are open along the sides of the center plates 72 parallel to the major axis of the row lines, which could present problems if particulates of the right size entered these gaps 94. Electrical insulation and protection against particulates is provided as shown in FIG. 6 by a flexible protective covering 220 which is a deformable, thin electrically insulating sheet or film that can be replaced if needed. The covering 220 preferably includes an insulating layer 222 which may be made of any suitable material such as polyester, polyvinyl chloride or other polymeric material preferably in the range of 5 microns to 25 microns thick. The covering 220 also preferably includes a metallic ground protection layer or shield 224 deposited on top of and integrally bonded to layer 222 to reduce or eliminate electrical noise such as EMI or static discharge. Such a shield layer 224 can be provided by evaporating a thin film of aluminum preferably in the range 500 to 1000 angstroms thick on the top side of the insulating film 222. In our prototype arrays, we used a 12-micron thick polyester film 222 covered by a 500-angstrom thick layer of aluminum.

If additional compliance is required, a second somewhat softer and thicker pad made of any suitable material can be used on top of the protective covering 220. However, this additional pad should be capable of transmitting force effectively to the force sensors therebelow. The insulating film 222 may be attached to the silicon wafer using any conventional bonding technique like adhesives, i.e., epoxy or the like. The same metallic layer which is patterned to form the column lines can also be used to form traces and bonding pads, such as trace 228 and electrical connection pad 230 shown in FIG. 6. The rightmost portion 232 of trace 228 is shown to be disposed at least partially under rail portion 234 of the bridge structure 236, which illustrates the silicon-to-glass lead transfer technique previously mentioned.

Figure 7:
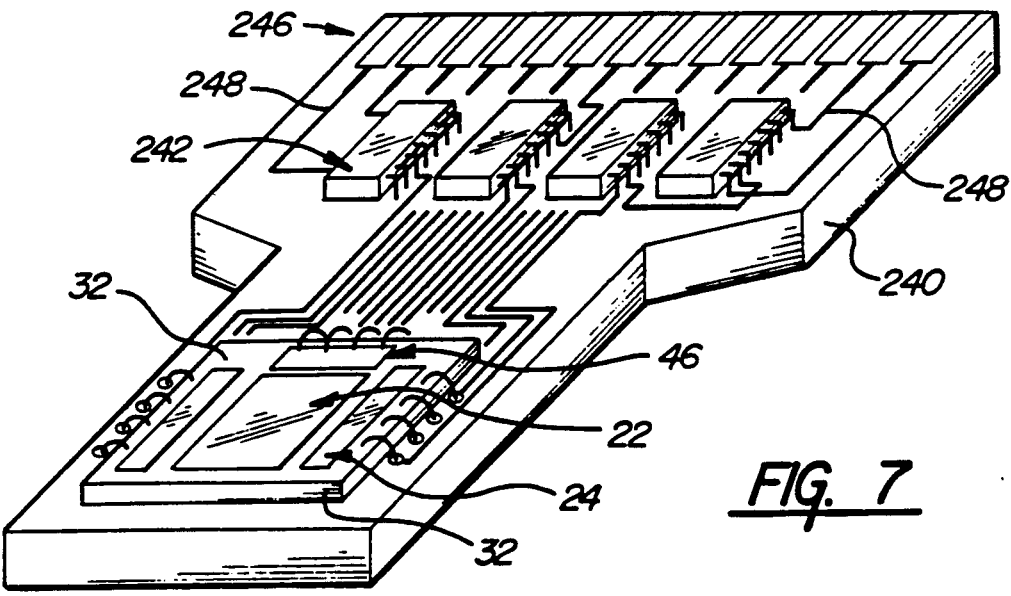
FIG. 7 is a preferred packaging and mounting arrangement for the tactile imager of the present invention, which utilizes pre-amplification multiplexers beam-lead bonded to the transducer support substrate and electrically disposed between the transducer matrix and amplifiers to reduce significantly the number of external electrical connections required.

FIG. 7 shows a preferred arrangement for packaging and mounting the tactile imager 22 including the glass substrate 32 on a printed circuit board 240. Upon the board 240 is also mounted integrated circuit chips 242 (four exemplary IC chips are shown) containing the signal-conditioning electronics 52 and perhaps the microprocessor 30 shown in FIG. 1, or other circuits or logic for electronic control purposes as may be desired. The printed circuit board may employ conventional connector traces 246 for receiving a conventional ribbon-style electrical edge connector. Conventional traces 248 extending from the connector pads 246 to the integrated circuit chips 242 provide the usual electrical paths for signals. However, it is preferred to mount the row, select and drive circuitry 24, the multiplexers 46 and possibly part or all of column decoder logic 46 directly on the glass substrate to which the array 22 is connected. This is preferably accomplished by using pre-tested integrated circuit chips which are connected in beam-lead or flip-chip fashion to suitable bonding pads formed on the glass substrate 32 by patterning the titanium/platinum/gold layer from which the lower capacitor plates are formed. Using this approach greatly decreases the number of output leads or connections which have to be made between the glass substrate 32 and the printed circuit board 240, thus greatly simplifying the packaging, increasing reliability, and reducing overall costs.

In our prototypes of the array 22, we have demonstrated that it is possible to use the multiplexers 48 mentioned in connection with FIG. 1 to output signals from the 32 columns C0-C31 into four output lines 50 to the four amplifiers 54 without overriding the analog output signals from the force sensors with excessive switching noise. Using the switched-capacitor readout circuitry of the type shown and mentioned in connection with FIG. 1, we have been able to measure capacitance values in our prototype arrays 22 as small as 3 fF. Therefore, the foregoing technique of fabricating the imaging array 22 into an overall imaging system is advantageous in that it eliminates for integration of circuitry on the same substrate as the imaging array, while maintaining the capability of accurately reading very small analog signals generated by the force-sensitive cells. Of course, if desired the column lines C0-C31 can be connected directly to individual amplifiers 54, which is the conventional approach.

It should be appreciated that the tactile structures and arrays of the foregoing embodiments and the fabrication processes used to form them are well-suited to achieve the objects above stated. It is recognized that those skilled in the art may make various modifications or additions to the preferred embodiments chosen to illustrate the invention without departing from the spirit and scope to the art. For example, the thickness, size and shape of the metal lines, pads, insulating layers and/or row lines, center plate and support beams may be varied to suit the intended applications for or desired response characteristics of the particular devices being fabricated. Also, the voltage used to accomplish the electrostatic bonding may vary greatly, from about 10 volts DC up to about 2,000 volts DC or more, depending upon the bonding temperatures, times, and thicknesses and relative conductivities of the various substrates, films and layers. Also, the correlative terms "row" and "column," "upper," and "lower," "left" and "right," and the like are used herein to make the description and claims more readily understandable, and are not to limit the scope of the invention. In this regard, those skilled in the art will readily appreciate such terms are often merely a matter of perspective and are interchangeable merely by altering one's perspective, e.g., rows become columns and vice versa when one's view is rotated 90 degrees. Accordingly, it is to be understood that the present invention is not limited to the specific embodiments chosen to illustrate the invention, but should be deemed to extend to the subject matter defined by the appended claims, including all fair equivalents thereof,

We claim:

1. A miniature tactile imaging array having a plurality of adjustable parallel plate capacitors each of which is responsive to force applied to one plate thereof, the array comprising:

a support substrate having an insulating surface;

at least first and second electrically conductive stripes spaced from one another and disposed on the insulating surface and constituting a set of address lines;

a first plurality of electrically conductive plates spaced from one another and electrically connected to the first stripe, each such plate forming one plate of a distinct one of the adjustable capacitors;

a second plurality of electrically conductive plates spaced from one another and electrically connected to the second stripe, each such plate forming one plate of a distinct one of the adjustable capacitors; and first and second pluralities of force-sensitive bridge structures made from a common wafer of single-crystal semiconductor material, with the first and second pluralities of bridge structures being electrically isolated from one another and with the bridge structures within each such plurality of bridge structures being electrically interconnected to one another and constituting at least part of one line of a set of output lines, said output lines being formed so as to cross the set of first address lines at an angle, each such bridge structure including a central plate portion, a pair of flexible beam portions thinner than the central plate portion and connected to, supporting and extending outwardly from opposite sides of the central plate portion, and a pair of side support portions each permanently attached to the support substrate and connected to and supporting a distinct one of the beam support portions on a side thereof opposite the central plate portion, the central plate portion and beam portions being positioned and patterned such that the central plate portion is nominally suspended and directly supported a predetermined distance above the insulating surface of the support substrate only by the pair of flexible beam portions, and each such bridge structure being positioned with its central plate portion located above a distinct one of the electrically conductive plates, whereby each such central portion constitutes a second plate of a distinct one of the adjustable capacitors.

2. A tactile imaging array as in claim 1 wherein:

the single-crystal semiconductor material is primarily silicon which has been doped so as to be at least moderately electrically conductive.

3. A tactile imaging array as in claim 1, wherein the bridge structures associated with each of the second address lines are contiguous such that the single-crystal semiconductor material extends continuously from near one side of the array to near the opposite side of the array without interruption.

4. A tactile imaging array as in claim 1, wherein adjacent bridge structures in each second address line share a common side support portion, with one of the beam support portions of each such adjacent bridge structure extending in opposite directions away from side support portion.

5. A tactile imaging array as in claim 1, wherein the first and second address lines are arranged orthogonally with respect to one another, and the first plurality of electrically conductive plates are arranged in line with respect to the first electrically conductive stripe and the second plurality of electrically conductive plates are arranged in line with respect to the second electrically conductive stripe.

6. A tactile imaging array as in claim 1, wherein:
the bridge structure for each sensor is substantially identical;
the central plate portion has first and second surfaces parallel to the electrically conductive plate disposed thereunder, with the first surface being closer to the conductive plate;
the second surface extends to a height greater than the height of all rim support portions of any adjacent sensor; and
the beam support portions of each bridge structure are generally planar and arranged in a common plane.

7. A tactile imaging array as in claim 6, wherein on at least the first surface of each central plate portion there is disposed a thin layer of insulating material extending over an area at least coextensive with the adjacent electrically conductive plate and nominally spaced therefrom such that the layer of insulating material protects against undesired short circuit conditions which would otherwise occur between the central plate portion and the electrically conductive plate upon application of excessive force to the bridge portion.

8. A tactile imaging array as in claim 1, further comprising a thin continuous film of flexible material disposed over all of the bridge structures of the array and bonded to the insulating surface of the support substrate, thereby helping to prevent entry of foreign matter into gaps between the central plate portions and the electrically conductive plates immediately adjacent thereto.

9. A miniature tactile sensor structure made at least in part from single-crystal semiconductor material and including therein a parallel plate capacitor whose capacitance varies generally in accordance with the magnitude of a mechanical force applied thereto, comprising:
a support substrate having at least one generally flat surface upon which an electrically conductive pad is formed, the pad constituting one plate of the capacitor; and a force-sensing bridge structure made from a unitary piece of patterned single-crystal semiconductor material and having a pair of generally elongated support rails spaced apart from one another permanently mounted to the support substrate, having a predetermined first height, a relatively thick plate centrally located between the pair of support rails, and a pair of flexible relatively thin beams located on opposite sides of and mechanically interconnecting the thick plate to the support rails, thereby allowing the thick plate to move in response to a sufficient mechanical force applied thereto in a direction normal to the surface of the support substrate;
the thick plate being spaced apart from the surface of the support substrate, supported by the thin beams and having a second height above the surface of the support substrate greater than the first height, whereby mechanical contact between the bridge structure and a larger object moving generally perpendicular towards the bridge structure occurs first at the thick plate; and
the thick plate being unsupported on two sides thereof intermediate the thin support beams and forming the second plate of the capacitor.

10. A tactile sensor structure as in claim 9, wherein the single-crystal semiconductor material is predominantly silicon.

11. A tactile sensor structure as in claim 9, wherein the relatively thick plate is at least moderately electrically conductive and constitutes a second movable plate of the capacitor.

12. A tactile sensor structure as in claim 11, wherein the semiconductor material is doped to render it at least moderately electrically conductive, and the entire bridge structure constitutes a portion of an electrical conductor for transferring electrical charge between the movable plate and an externally located circuit for measuring such transfer of electrical charge.

13. A tactile imaging array as in claim 1, further comprising:
at least eight readout lines,
a plurality of amplifiers to which the readout lines are electrically connected, and
a plurality of multiplexer means disposed between the readout lines and the amplifiers, each such multiplexer means including at least four analog input lines and at least one output line and being for selectively connecting in succession each of its input lines to its output line so that the output of the at least four readout lines from the tactile imaging array is deliverable over the one output line of said multiplexer means to one of the amplifiers.

14. A tactile imaging system as in claim 13, further comprising:
an insulating substrate to which the tactile imaging array is bonded, the insulating substrate including thereon electrically conductive traces extending between the imaging array and bonding pads, and wherein
each of the multiplexing means is contained within a pretester integrated circuit chip bonded directly to selected bonding pads.

* * * * *

UNITED STATES PATENT AND TRADEMARK OFFICE
CERTIFICATE OF CORRECTION

PATENT NO. : 5,055,838

DATED : October 8, 1991

INVENTOR(S) : Wise et al

It is certified that error appears in the above-identified patent and that said Letters Patent is hereby corrected as shown below:

On the title page: Item [75]

after "Japan" insert ---- ; Khalil Najafi, Ann Arbor, Mich. ----

Column 7, line 21, delete "batching" and insert ---- hatching ----.

Column 7, line 22, delete "batched" and insert ---- hatched ----.

Column 7, line 44, delete "4,815,471" and insert ---- 4,815,472 ----.

Signed and Sealed this

Thirteenth Day of July, 1993

*Attest:*

MICHAEL K. KIRK

*Attesting Officer*     *Acting Commissioner of Patents and Trademarks*